July 14, 1931.  C. W. HANSELL  1,813,922
DETECTION OF FREQUENCY MODULATED SIGNALS
Filed Jan. 30, 1929
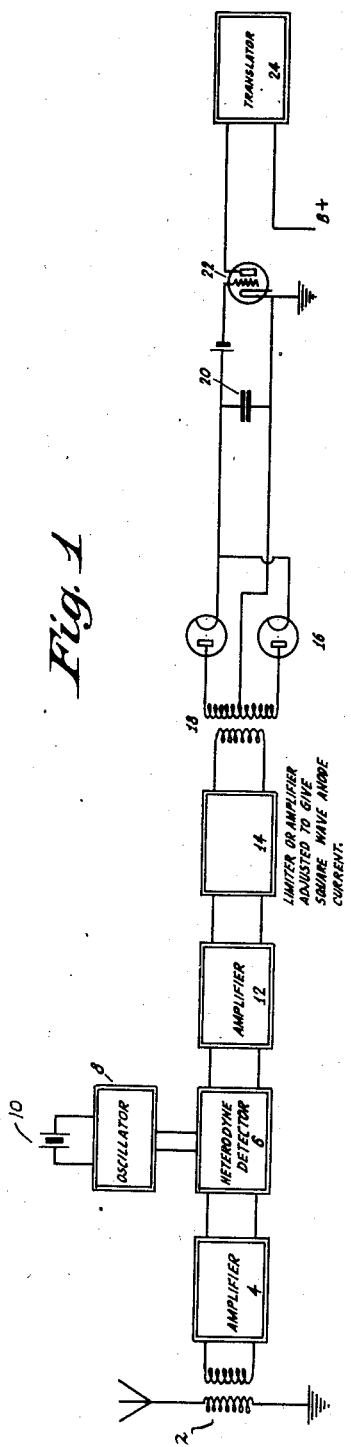
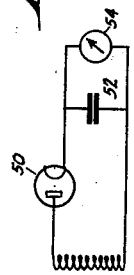
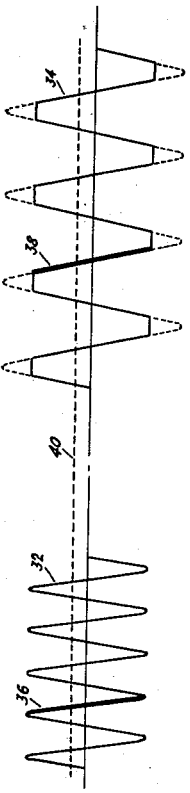
Inventor
CLARENCE W. HANSELL
By his Attorney Patented July 14, 1931

1,813,922

UNITED STATES PATENT OFFICE

CLARENCE W. HANSELL, OF PORT JEFFERSON, LONG ISLAND, NEW YORK, ASSIGNOR TO RADIO CORPORATION OF AMERICA, A CORPORATION OF DELAWARE

DETECTION OF FREQUENCY MODULATED SIGNALS

Application filed January 30, 1929. Serial No. 336,106.

This invention relates to a method and means for securing a response dependent upon the frequency of alternating electrical energy, and more particularly to a method and means for detecting frequency modulated signals.

The primary object of my invention is to provide a method and means for securing a frequency indication, and to this end, I so limit the amplitude and energy per cycle of the alternating energy that the energy per unit of time is proportional to the number of cycles per unit of time, and I then rectify the resulting energy, so that the magnitude of the rectified energy may be used as an indication of the frequency of the alternating energy.

More specifically, I limit the amplitude of the received alternating energy so greatly that the output current is practically square in wave form, and thereafter transfer the energy through an inductive transformer, so that the output in the secondary of the transformer depends upon the magnitude and slope of the sides of the current wave fed to the primary of the transformer. These sides, having already been made equal in amplitude, and of substantially the same nearly perpendicular slope, the output impulses for each cycle are the same, and the number of these impulses in a unit of time depends solely upon the frequency of the input energy.

In order to detect frequency modulated signals it has heretofore been proposed to first change the frequency modulation to amplitude modulation by impressing the received signals on a resonant circuit tuned to a frequency lying outside the operating range of frequency, and thereafter to detect the resulting amplitude modulated signals in order to obtain signal frequency energy for use in a translating device. This method is difficult to free from distortion, and is limited in usefulness by the fact that the resonance characteristic of a tuned circuit may differ under dynamic conditions, such as exist when the frequency of the energy applied thereto is rapidly varying, from what it is under static conditions, when each frequency applied thereto is kept constant for a considerable period of time.

It is a further object of my invention to provide a frequency modulation detector which is sensitive and free from distortion. For this purpose I employ the method already described for obtaining frequency indication, and utilize the signal frequency component of the rectified energy for translation.

If it is desired to obtain linear amplitude response, instead of linear energy response, that is, if it is desired to obtain amplitudes proportional to the frequency of the received signal energy, I may employ between the detector and the translating device an amplifier having a characteristic following a three halves or a square law, which results in the desired transformation. I do not consider this a detector stage, even though an asymmetric characteristic is employed, because the output frequency which is actually utilized is equal to the input frequency, that is, it is the modulation frequency.

The sensitivity of the circuit is enhanced if the percentage frequency modulation is increased, and according to my invention the relatively slight modulation of the received carrier is increased by heterodyning the received energy with locally generated energy of constant frequency. The resulting beat energy has a variation in frequency equal to that of the received carrier, but, the modulation being impressed on a lower carrier, the percentage modulation is greatly increased.

My invention is further described in the following specification, which is accompanied by drawings in which Figure 1 is a wiring diagram for a circuit embodying the invention; Figure 2 is explanatory of the operation of the invention; Figure 3 is a portion of Figure 1 showing a different indicating means.

Referring to Figure 1 of the drawings it will be seen that there is an antenna system 2, energy collected by which is fed to an amplifier 4, the output from which is preferably heterodyned in a heterodyne detector 6 with energy of constant frequency obtained from a local oscillator 8, the frequency constancy of which is maintained by a crystal 10.

The energy from the heterodyne detector 6 is frequency modulated, like the received energy, but the percentage frequency modulation is greatly increased. This energy may be further amplified in an amplifier 12, which is followed by a limiter 14. The limiter is simply an amplifier adjusted to give anode current having a practically square wave form. Of course, the amplifier 12 may be made to act as a limiter, instead of employing a separate amplifier and limiter. The energy from the limiter 14 is fed to a rectifier 16, here shown as a full wave rectifier, through an inductive transformer 18. The transformer serves to apply to the rectifier impulses of potential the magnitude of which depends upon the amplitude and slope of the sides of the current wave fed to the primary of the transformer. The anode current having been made of constant amplitude and of practically square wave form, these impulses become uniform, and their frequency depends upon the frequency of the received signalling energy.

This may better be explained in connection with Figure 2, showing a relatively high frequency small amplitude current wave 32, contrasted with a slower frequency higher amplitude current wave 34. Because of the limiting action the extremes of the current wave 34 are chopped off, as is indicated on the drawings. Now the potential across the secondary of the transformer depends upon the rate of change of current, and therefore is not affected by the magnitude of the flat tops in the current wave, but only by the sides of the current wave, as for example the side 36 in the wave 32, and the side 38, in the wave 34, and these sides are substantially alike. It should be kept in mind that the case illustrated in Figure 2 is most unfavorable to the operation of the invention, for actually the limiting may be adjusted, say, at the level of the dotted line 40, in which case the sides of the current wave are practically perpendicular.

The output from the rectifier is applied to a condenser 20, which is a by-pass condenser for the radio frequency component of the rectified energy, but is of relatively high reactance to the modulation frequency. The modulation potential is applied to an amplifier tube 22, and thence to a translating device 24 of any appropriate type. The rectified output may be applied directly to the translating device, instead of being intermediately amplified, but amplification is desirable, not only to strengthen the modulation energy, but also because the amplifier may be made to produce a linear amplitude response, instead of a linear energy response, by using a tube having a characteristic which approximates a three halves or possibly even a square law. I consider the tube 22 an amplifier tube, even though it possesses an asymmetric characteristic, such as I have described, because energy of the same frequency as is supplied to its input circuit is taken from its output circuit for utilization.

In case steady frequencies are being dealt with the indicating device may take the form simply of a direct current ammeter or other measuring instrument, and this has been indicated in Figure 3, in which the rectifier 50 is coupled to a condenser 52, across which there is an indicating instrument 54. The rectifier has here been illustrated as a half wave rectifier, inasmuch as a full wave rectifier, while desirable, is not essential.

In appropriate cases the translating means may be a loud-speaker, tape recorder, picture or facsimile recorder, and so on. Also, the signal energy may be amplified, after rectification, to any desired extent.

I claim:

1. The method of securing a response dependent upon the frequency of alternating electrical energy which includes so limiting the amplitude and energy per cycle of the energy that the energy per unit of time is proportional to the number of cycles per unit of time, rectifying the resulting energy, and utilizing the magnitude of the rectified energy as an indication of frequency.

2. The method of detecting frequency modulated signals which includes limiting the received energy, inductively transforming the limited energy, rectifying the transformed energy, and utilizing the signal frequency component of the rectified energy for translation.

3. The method of detecting frequency modulated signal energy which includes amplifying and so limiting the amplitude and energy per cycle of the received energy that the energy per unit of time is proportional to the number of cycles per unit of time, rectifying the resulting energy, and utilizing the rectified energy for translation.

4. The method of detecting frequency modulated signal energy which includes limiting the received energy, inductively transforming the limited energy, so that the energy per unit of time is proportional to the frequency, rectifying the resulting energy, and utilizing the rectified energy for translation.

5. The method of obtaining distortionless detection of frequency modulated signal energy which includes limiting the received energy, inductively transforming the limited energy, so that the energy per unit of time is proportional to the frequency, rectifying the resulting energy, amplifying the rectified energy in accordance with a characteristic approximately following a three halves law, and utilizing the amplified energy for translation.

6. The method of receiving frequency modulated signals which includes collecting the signal energy, heterodyning the collected energy with locally generated energy of constant frequency, so limiting the amplitude and energy per cycle of the resulting energy that the energy per unit of time is proportional to the frequency, rectifying the resulting energy, and utilizing the rectified energy for translation.

7. The method of receiving frequency modulated signals which includes collecting the signal energy, heterodyning the collected energy with locally generated energy of constant frequency in order to increase the percentage frequency modulation, limiting the resulting energy, inductively transforming the limited energy so that the energy per unit of time is proportional to the frequency, rectifying the transformed energy, and utilizing the rectified energy for translation.

8. An arrangement for securing a response dependent upon the frequency of alternating electrical energy supplied thereto comprising means to so limit the amplitude and energy per cycle of the supplied energy that the energy per unit of time is proportional to the number of cycles per unit of time, means to rectify the resulting energy, and means responsive to the average magnitude of the rectified energy as an indication of frequency.

9. An arrangement for detecting frequency modulated signals comprising means to limit the received energy, means to rectify the limited energy, an inductive transformer therebetween, and a translating device responsive to the signal frequency component of the rectified energy.

10. An arrangement for detecting frequency modulated signal energy comprising means to amplify and so limit the amplitude and energy per cycle of the received energy that the energy per unit of time is proportional to the number of cycles per unit of time, means to rectify the resulting energy, and a translating device responsive to the rectified energy.

11. An arrangement for detecting frequency modulated signal energy comprising means to limit the received energy, means to inductively transform the limited energy, so that the energy per unit of time is proportional to the frequency, means to rectify the resulting energy, and means to translate the rectified energy.

12. An arrangement for distortionless detection of frequency modulated signal energy comprising means to limit the received energy, means to inductively transform the limited energy, so that the energy per unit of time is proportional to the frequency, means to rectify the resulting energy, means to amplify the rectified energy in accordance with a characteristic approximately following a three halves law, and means to translate the amplified energy.

13. An arrangement for the reception of frequency modulated signals comprising means to collect the signal energy, means to heterodyne the collected energy with locally generated energy of constant frequency, means to so limit the amplitude and energy per cycle of the resulting energy that the energy per unit of time is proportional to the frequency, means to rectify the resulting energy, and means to translate the rectified energy.

14. An arrangement for the reception of frequency modulated signals comprising means to collect the signal energy, means to heterodyne the collected energy with locally generated energy of constant frequency in order to increase the percentage frequency modulation, means to limit the resulting energy, means to inductively transform the limited energy so that the energy per unit of time is proportional to the frequency, means to rectify the transformed energy, and means to translate the rectified energy.

CLARENCE W. HANSELL.